United States Patent
Sih et al.

(10) Patent No.: US 7,493,131 B2
(45) Date of Patent: Feb. 17, 2009

(54) VELOCITY RESPONSIVE POWER CONTROL

(75) Inventors: Gilbert Christopher Sih, San Diego, CA (US); Shimman Patel, San Diego, CA (US); Thunyachate Ekvetchavit, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 10/097,039

(22) Filed: Mar. 12, 2002

(65) Prior Publication Data

US 2003/0176203 A1 Sep. 18, 2003

(51) Int. Cl.
*H04B 7/00* (2006.01)
*H04Q 7/20* (2006.01)

(52) U.S. Cl. .............. 455/522; 455/69; 455/13.4; 455/570; 455/571; 455/573; 455/574; 455/127.1; 455/404.2; 455/456.1; 370/318

(58) Field of Classification Search ............. 455/522, 455/96, 13.4, 7, 570, 571, 572, 573, 574, 455/127.1, 69, 553.1, 404.2, 456.1, 1; 370/317, 370/318

See application file for complete search history.

(56) References Cited

U.S. PATENT DOCUMENTS

| 5,574,984 | A | * | 11/1996 | Reed et al. ............. 455/69 |
| 6,070,086 | A | * | 5/2000 | Dobrica ................ 455/522 |
| 6,075,815 | A | | 6/2000 | Chheda et al. .......... 375/227 |
| 6,233,439 | B1 | * | 5/2001 | Jalali .................. 455/127.2 |
| 6,249,682 | B1 | * | 6/2001 | Kubo et al. ............ 455/522 |
| 6,252,865 | B1 | | 6/2001 | Walton et al. ........... 370/335 |
| 6,377,813 | B1 | * | 4/2002 | Kansakoski et al. ..... 455/522 |
| 6,501,961 | B1 | * | 12/2002 | Kirkpatrick ........... 455/553.1 |
| 6,618,596 | B1 | * | 9/2003 | Uchida ................ 455/522 |
| 2001/0010686 | A1 | | 8/2001 | Kubo et al. ............ 370/335 |
| 2002/0111184 | A1 | * | 8/2002 | Takano et al. .......... 455/522 |

FOREIGN PATENT DOCUMENTS

| DE | 19938494 | 3/2001 |
| EP | 0812119 | 12/1997 |
| RU | 2179370 | 1/2002 |

OTHER PUBLICATIONS

Ovesjo, Fredrik. et al., "Frames multiple acces mode 2-wideband CDMA" Waves of the year 2000+, the 8th IEEE International Symposium on Personal, Indoor and Mobile Radio Communications, PIMRC, IEEE, Sep. 1, 1997, pp. 42-46.
International Search Report PCT/US2003/007398 International Search Authority European Patent Office Jul. 25, 2003.
International Preliminary Examination Report PCT/US2003/007398 IPEA/US Oct. 14, 2006.

* cited by examiner

*Primary Examiner*—Yuwen Pan
*Assistant Examiner*—Shaima Q Aminzay
(74) *Attorney, Agent, or Firm*—Howard H. Seo; Eric Ho; Thomas R. Rouse

(57) ABSTRACT

The velocity of a wireless communications device (WCD) (106) is estimated. In response to this estimate a power control command rate is determined. The WCD 106 transmits power control signals to a base station (102) according to the power control command rate. The power control command rate may be determined by mapping the estimated velocity to a velocity range, and selecting a rate that corresponds to the velocity range as the power control command rate. Velocity is estimated by measuring a level crossing rate of a multipath signal.

23 Claims, 13 Drawing Sheets

| RATE | TIME SLOTS | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| ╳ | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ | $C_{16}$ | 17 | 18 |
| $R_{MAX}$ | $C_1$ | U | D | $C_2$ | U | D | $C_3$ | U | D | $C_4$ | U | D | $C_5$ | U | D | | ⋯ | ⋯ |
| $0.33 * R_{MAX}$ | $C_1$ | $C_2$ | U | D | $C_3$ | $C_4$ | U | D | $C_5$ | $C_6$ | U | D | $C_7$ | $C_8$ | D | D | ⋯ | ⋯ |
| $0.5 * R_{MAX}$ | $C_1$ | $C_2$ | $C_3$ | U | D | $C_4$ | $C_5$ | $C_6$ | U | D | $C_7$ | $C_8$ | $C_8$ | U | U | D | ⋯ | ⋯ |
| $0.6 * R_{MAX}$ | $C_1$ | $C_2$ | $C_3$ | $C_3$ | D | $C_4$ | $C_5$ | $C_6$ | U | D | $C_7$ | $C_8$ | $C_8$ | U | D | D | ⋯ | ⋯ |

VELOCITY RESPONSIVE POWER CONTROL

BACKGROUND OF THE INVENTION

1. Field of the Invention

The present invention relates generally to wireless communications devices. More specifically, the present invention relates to power control algorithms for use in mobile communications environments.

2. Related Art

Mobile communications devices, such as wireless phones, are often employed in vehicles or other mobile platforms that travel at relatively high velocities. For example, mobile communications devices are often used in automobiles, trains, and airplanes that travel at speeds as fast as several hundred kilometers per hour.

In wireless communications environments, signals are often transmitted between a transmitter and a receiver across a fading channel. When the transmitter and the receiver have a relative velocity with respect to each other, signals received from such fading channels exhibit fluctuations in amplitude and phase. These fluctuations have a peak rate that is proportional to this relative velocity.

Many wireless communications systems employ power control algorithms to promote the efficient use of radio frequency (RF) energy. In a mobile communications environment, power control algorithms involve the transmission of power control commands from communications devices to base stations. When a particular device sends a power control command, it directs the base station to adjust the power of it transmissions designated for that particular device. Thus, base stations typically receive commands directing a power increase or commands directing a power decrease.

Conventional wireless communications systems employ algorithms where power control commands are transmitted at a fixed-rate. Unfortunately, for these fixed command rate systems, as the rate of amplitude and phase fluctuations varies, the effectiveness of these commands also varies.

Therefore, conventional systems that employ the transmission of power control commands at a fixed rate are unable to optimally control power levels at all velocity ranges. Thus, for such fixed-rate systems, communications devices receive signals having higher power levels than are necessary to fulfill specified quality of service requirements. As a consequence, base stations receiving fixed-rate power control commands transmit signals having excessive power that could otherwise be used to support additional communications devices. Accordingly, system capacity becomes wasted.

Accordingly, what is needed is a method and system for dynamically adjusting power control operations in response to a device's velocity.

SUMMARY OF THE INVENTION

The present invention is directed to a method and system for providing velocity responsive power control in a wireless communications device (WCD) that receives signals from a base station. The method and system estimate the velocity of the device; determine a power control command rate in response to the estimated velocity; and transmit power control signals to the base station according to the power control command rate.

The power control command rate is determined by mapping the estimated velocity to a velocity range, and selecting a rate that corresponds to the velocity range as the power control command rate.

The device's velocity is estimated by measuring a level crossing rate of a multipath signal. Alternatively, this velocity may be estimated through the periodic monitoring of the device's location through services such as the global positioning system (GPS).

The present invention advantageously facilitates an efficient use of available transmit power and maximizes the number of communications devices that a base station can support.

BRIEF DESCRIPTION OF THE DRAWINGS

The present invention will be described with reference to the accompanying drawings. In the drawings, like reference numbers generally indicate identical, functionally similar, and/or structurally similar elements. The drawing in which an element first appears is indicated by the leftmost digit(s) in the reference number.

FIG. 6 is a chart illustrating a set of exemplary command patterns, where each pattern creates an effective power control rate;

DETAILED DESCRIPTION OF THE INVENTION

I. Communications Environment

Figure 1:
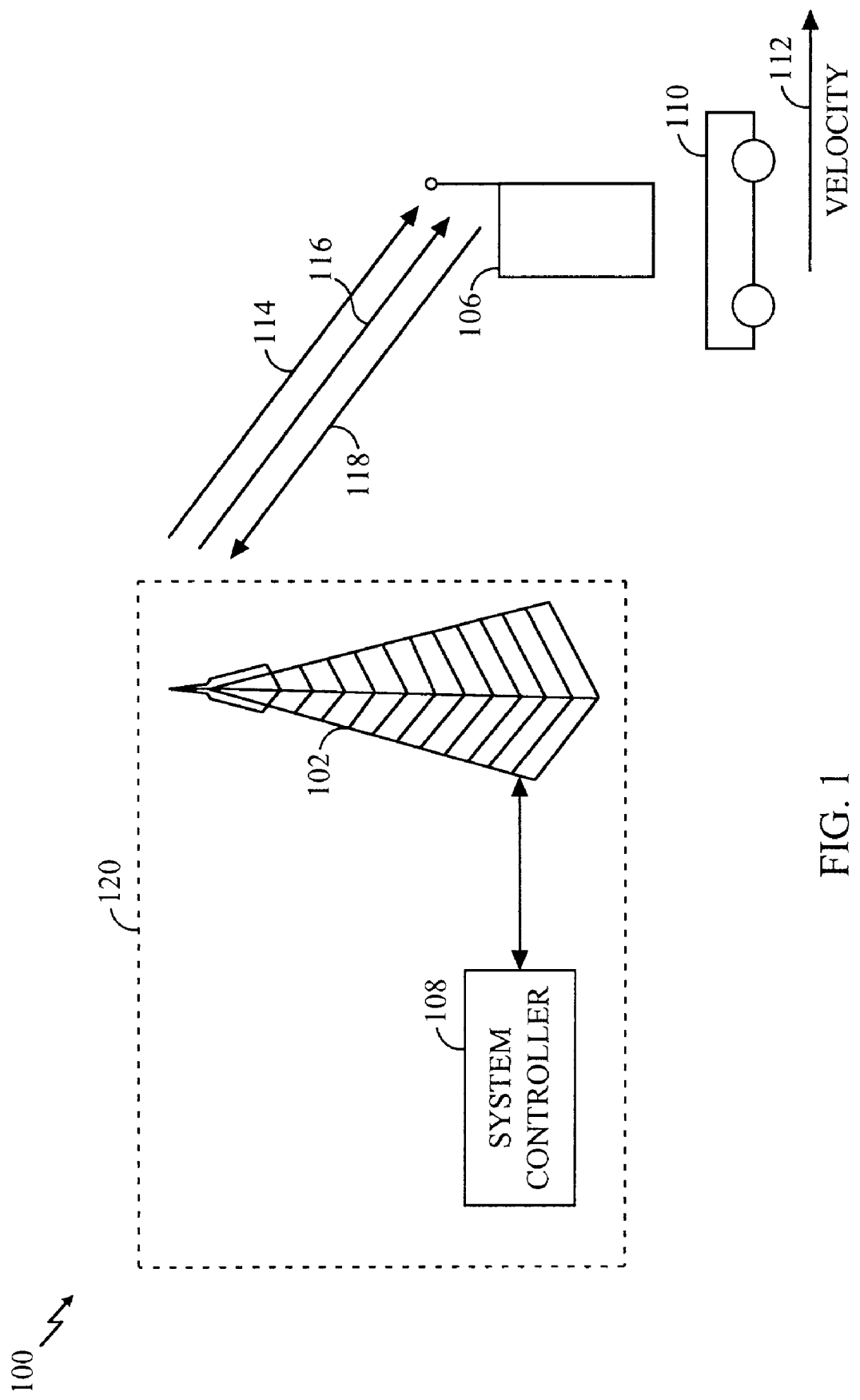
FIG. 1 is a block diagram of an exemplary mobile communications environment.

Before describing the invention in detail, it is helpful to describe an example environment in which the invention may be implemented. The present invention is particularly useful in mobile communications environments. FIG. 1 illustrates such an environment.

FIG. 1 is a block diagram of an exemplary mobile communications environment 100. Communications environment 100 includes a base station 102, a system controller 108, a wireless communications device (WCD) 106, and a mobile platform 110.

Base station 102 is coupled to system controller 108. Together, base station 102 and system controller 108 are part of a wireless communications system (WCS) 120 that exchanges information with WCD 106. This information exchange provides services, such as cellular telephony, and personal communications system (PCS) applications.

This exchange of information between WCS 120 and WCD 106 occurs across various communications channels. Of these various communications channels, a pilot channel 114 and a traffic channel 116 are shown in FIG. 1. These channels enable the transfer of information from base station 102 to WCD 106.

Traffic channel 116 carries traffic signals conveying information, such as digitally encoded voice and data. Pilot channel 114 carries pilot signals to WCD 106 from base station 102. Pilot signals enable WCD 106 to determine the timing of traffic signals transmitted across traffic channel 116. This timing determination enables WCD 106 to receive and process information contained in the traffic signals.

These traffic signals and pilot signals are CDMA signals. CDMA signals are generated from symbol sequences through channelizing and spreading processes. Spreading involves multiplying a symbol sequence with a spreading sequence, such as a pseudonoise (PN) sequence. Channelizing involves the use of orthogonal channelizing codes, such as Walsh codes. Such codes enable multiple transmissions to simultaneously share portions of the radio frequency (RF) spectrum without interference.

An exemplary CDMA signal generation process involves channelizing a symbol sequence, such as a stream of binary bits, with a Walsh code, and then spreading the "channelized" sequence with a quadrature pair of PN sequences. This spreading function produces an in-phase (I) CDMA sequence, and a quadrature (Q) CDMA sequence. These in-phase and quadrature sequences (not shown) are then modulated through quadrature phase shift keying (QPSK) and transmitted to WCD 106 as an RF signal.

As described above, pilot signals transmitted across pilot channel 114 provide timing references for traffic signals transmitted across traffic channel 116. These timing references allow WCD 106 to synchronize its demodulator to the spreading and channelization functions performed by base station 102 so that the traffic symbols transmitted by base station 102 can be coherently demodulated. In addition, this phase reference allows WCD 106 to coherently demodulate traffic signals transmitted by base station 102.

Traffic signals transmitted across traffic channel 116 carry information sequences. Base station 102 encodes and interleaves information sequences into blocks, referred to herein as frames, before performing the channelizing and spreading operations described above.

A reverse power control channel 118 transfers information from WCD 106 to base station 102. This information includes power control commands that are generated in accordance with a power control algorithm. This power control algorithm is driven by signal-to-noise ratio (SNR) calculations made by WCD 106. These SNR calculations measure the quality of signals that WCD 106 receives from traffic channel 116. Each power control command directs base station 102 to adjust the power of its transmissions across traffic channel 116.

WCD 106 is a communications device, such as a portable telephone. As illustrated in FIG. 1, WCD 106 is attached to mobile platform 110. Mobile platform 110 has a motion that is defined by velocity vector 112. This motion causes Doppler frequency shifts in RF signals that WCD 106 receives from base station 102. Mobile platform 110 may be an automobile, a train, an airplane, or any other platform capable of transporting WCD 106 at velocities that affect the fading characteristics of RF signals received over channels 114 and 116.

II. Communications Device

Figure 2:
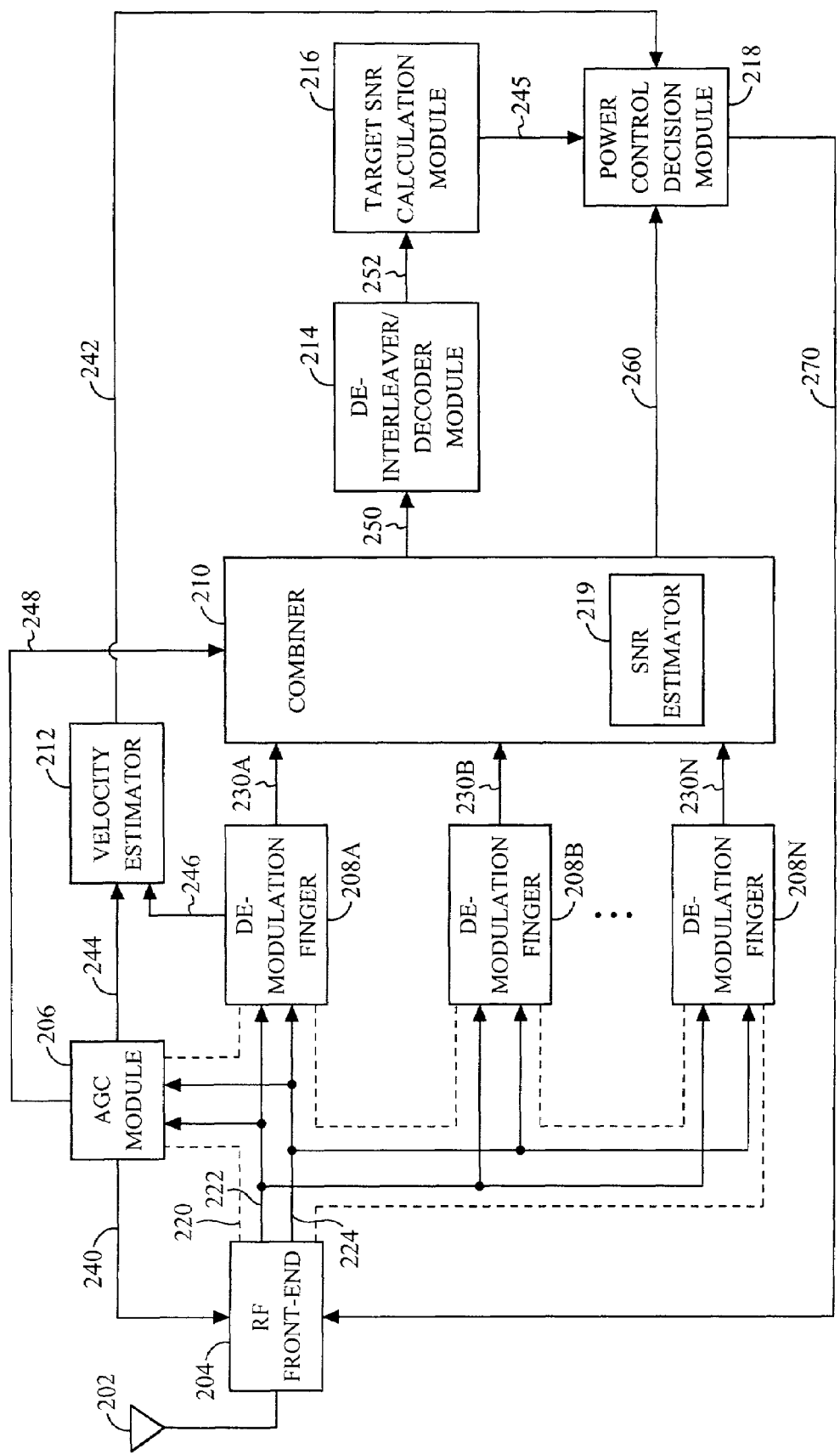
FIG. 2 is an illustration of a receiver portion of a wireless communications device.

FIG. 2 is an illustration of a receiver portion 200 of WCD 106.

Receiver portion 200 includes an antenna segment 202, an RF front end 204, an automatic gain control (AGC) module 206, a plurality of demodulation fingers 208a through 208n, a combiner 210, a velocity estimator 212, a deinterleaver/decoder module 214, a target signal to noise ratio (SNR) computation module 216, a power control decision module 218, and an SNR estimator 219 that is within combiner 210.

Antenna segment 202 receives radio frequency (RF) transmissions from one or more base stations, such as base station 102. Antenna segment 202 forwards these transmissions as electrical signals to RF front end 204.

The RF transmissions received by antenna segment 202 include pilot signals and traffic signals transmitted across pilot channel 114 and traffic channel 116, respectively. Each of these received signals may be a composite signal that includes a plurality of multipath components. Multipath components are individual RF wavefronts emitted by the same RF transmitter, but which arrive at a receiving antenna along different paths. These different paths are the result of wavefront reflections caused by physical terrain and structure surrounding WCD 106, as well as other physical occurrences in the RF transmission environment. The multipath components of a particular RF signal are substantially identical, except for a distinct time shift, power level, and carrier phase.

For the communications environment shown in FIG. 1, pilot signals and traffic signals sent across pilot channel 114 and traffic channel 116 may each have a plurality of multipath components. These multipath components will be grouped in signal pairings that include a pilot signal multipath component and a traffic signal multipath component. These paired multipath components will have substantially identical propagation delays and power attributes. As will be described below, WCD 106 identifies and processes these signal pairings in functional components referred to herein as demodulation fingers. These components are described below in greater detail with reference to FIG. 3.

In addition to receiving RF signals from one or more base stations, antenna segment 202 may receive electrical signals for wireless transmission from a transmit power amplifier (not shown) within WCD 106. Additionally, to enable the simultaneous transmission and reception of RF signals through a single antenna within antenna segment 202, antenna segment 202 may also include a diplexer (not shown).

RF front end 204 receives electrical signals from antenna segment 202 within an RF frequency band. Examples of RF frequency bands include a cellular frequency band centered at 800 MHz, and a personal communications services (PCS) communications band centered at 1.9 GHz. Upon reception, RF front end 204 down converts these electrical signals from the RF frequency band to baseband. In addition, RF front end 204 may filter the electrical signals received from antenna segment 202 in accordance with a predetermined bandwidth.

RF front end 204 also includes amplification components (not shown) that increase the power of RF signals, such as pilot and traffic signals, received by antenna segment 202. Exemplary amplification components include a low noise amplifier (LNA) to initially amplify signals upon reception by antenna segment 202, and a variable gain amplifier (VGA) to amplify these signals after they are mixed down to an intermediate frequency (IF) during the down conversion process described above. One or more of these amplification components have variable gains that are controlled by AGC module 206.

After downconversion to baseband, RF front end 204 passes the analog baseband signal through an analog-to-digital converter to transform the analog baseband signal into digital baseband signal set 220. Baseband signal set 220 includes an in-phase (I) signal component 222 and a quadrature (Q) signal component 224. AGC module 206 adjusts the gain of amplification components within RF front end 204. These adjustments maintain signal set 220 at a substantially constant power level. AGC module 206 performs these adjustments in response to feedback received from signal set 220. This feedback is used to measure the energy of signal set 220.

These adjustments performed by AGC module 206 involve sending a gain control signal 240 to RF front end 204. Gain control signal 240 may include a plurality of component signals, where each of these component signals corresponds to a particular amplification component within RF front end 204. These control signals may be analog or digital, and convey a gain setting for the corresponding amplification component.

AGC module 206 also determines the in-band energy for signals it receives from RF front end 204 and sends this determined value to SNR estimator 219 as an Io signal 248.

Velocity estimator 212 receives a voltage estimate 244 from AGC module 206 and a baseband pilot sequence set 246 from within one of demodulation fingers 208. Voltage estimate 244 is processed by velocity estimator 212 to provide a velocity estimate signal 242 that is sent to power control decision module 218. Velocity estimate signal 242 indicates the magnitude of velocity vector 112. Power control decision module 218 utilizes this velocity information to control the rate at which power control commands are sent to base station 102 across reverse power control channel 118. Various implementations of velocity estimator 212 are described below with reference to FIGS. 12 and 13.

The description now returns to baseband signal set 220. Like the incoming RF signals received by antenna segment 202, baseband signal set 220 includes a plurality of component signals. These component signals may include a plurality of multipath transmission components relating to one or more pilot channels 114 and traffic channels 116.

RF front end 204 passes baseband signal set 220 into each of demodulation fingers 208*a-n*. In turn, each demodulation finger 208 identifies and tracks a distinct signal pairing from baseband signal set 220. As described above, these signal pairings each include a pilot signal component and a time-aligned traffic signal component. Thus, demodulation fingers 208*a-n* may each individually track and receive a pilot signal component and a traffic signal component sharing the same multipath delay.

Demodulation fingers 208 track multipath components by integrating received pilot signals over a period of time to separate the power in one multipath component from the total received power. This period of time is based on RF fading characteristics.

Each of demodulation fingers 208 processes its respective signal pairing and outputs a corresponding symbol sequence 230. These symbol sequences are sent to combiner 210. Symbol sequences 230 match corresponding symbol sequences that were spread, encoded, modulated, and transmitted across traffic channel 116 by base station 102.

Upon output from each of fingers 208, symbol sequences 230 are summed by combiner 210, thereby producing a single symbol sequence 250.

Before summation, each individual sequence 230 may be weighted and/or processed in manners to optimize the quality of combined symbol sequence 250, as would be apparent to persons skilled in the relevant arts. Combiner 210 sends combined symbol sequence 250 to deinterleaver/decoder module 214.

Combiner 210 includes an SNR estimator 219. SNR estimator 219 estimates the SNR of traffic signals received over traffic channel 116. This estimate is sent to power control decision module 218 as a traffic SNR indicator 260. In generating traffic SNR indicator 260, SNR estimator 219 may employ various SNR estimation techniques. Exemplary SNR estimation techniques are described in detail below.

Deinterleaver/decoder module 214 receives symbol sequence 250 from combiner 210. As described above, base station 102 encodes and interleaves information sequences before transmitting them across traffic channel 116 in the form of traffic signals. Deinterleaver/decoder module 214 reverses these interleaving and encoding processes. First, module 214 deinterleaves symbol sequence 250, thereby generating a sequence of symbols that are organized into blocks referred to herein as frames.

Module 214 then decodes the frame of symbols into bits and computes a cyclic redundancy check to determine if any of the bits in the frame were incorrectly received. If such errors exist in a frame, deinterleaver/decoder module classifies the frame as an erasure (i.e., a bad frame).

Target SNR calculation module 216 generates a target SNR indicator 254, which is geared towards keeping the rate of bad frames (erasures) received across traffic channel 116 below a specified limit. Target SNR calculation module 216 measures this bad frame rate as a frame error rate (FER). For a given time interval, FER is calculated as the number of bad frames received divided by the total number of frames received.

The number of bad frames received is determined by counting the number of frame erasures classified by module 214. This number, as well as the number of frames received is sent to target SNR calculation module 216 as a frame statistics signal 252.

Target SNR calculation module 216 adjusts target SNR indicator 254 as the FER varies. This adjustment includes increasing target SNR indicator 254 as the FER increases and decreasing target SNR indicator 254 as the FER decreases.

Power control decision module 218 receives target SNR indicator 254 from target SNR calculation module 216 and traffic SNR indicator 260 from SNR estimator 219. By comparing values of indicators 254 and 260, power control decision module 218 generates power control commands that are sent across reverse power control channel 218 in a command stream 270.

This power control command generation includes generating a power increase command when indicator 260 is less than indicator 254 and generating a power decrease command when indicator 260 is greater than indicator 254.

Figure 3:
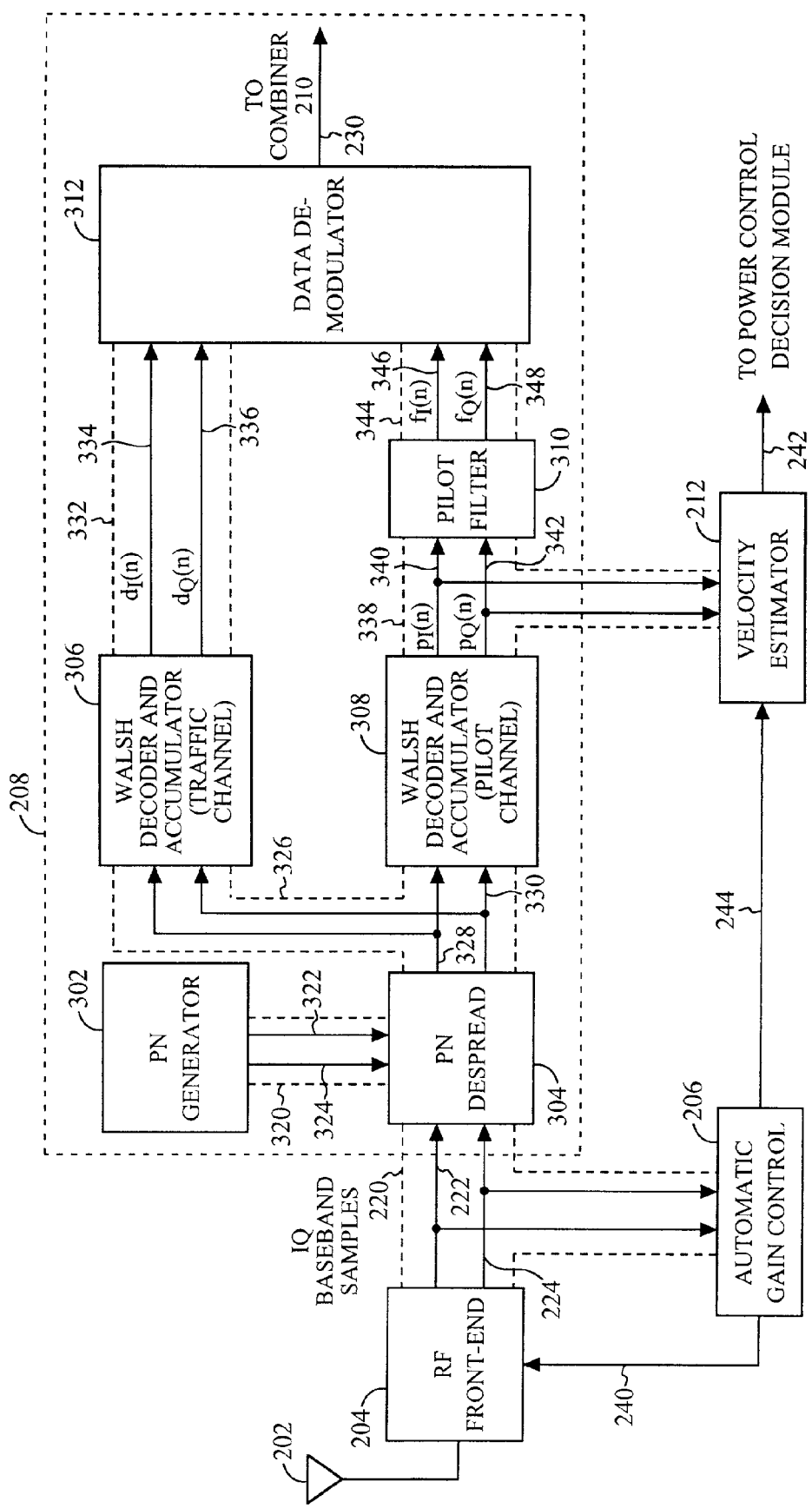
FIG. 3 is a block diagram illustrating an implementation of a demodulation finger.

FIG. 3 is a block diagram illustrating an implementation of a finger 208. This implementation provides information to velocity estimator 212. As shown in FIG. 3, finger 208 includes a PN sequence generator 302, a PN despreader 304, a traffic channel decoder 306, a pilot channel decoder 308, a low pass pilot filter 310 and a data demodulator 312.

PN sequence generator 302 generates a PN sequence set 320 that is sent to PN despreader 304. PN sequence set 320 includes an in-phase (I) PN sequence 322, which is aligned with I signal component 222, and a quadrature (Q) PN sequence 324, which is aligned with Q signal component 224.

PN despreader 304 receives baseband signal set 220 and processes it with PN sequence set 320 to produce despread signal set 326. Despread signal set 326 includes an in-phase (I) despread signal 328 and a quadrature (Q) despread signal 330. PN despreader 304 sends despread signal set 326 to decoders 306 and 308.

Decoder 306 correlates despread signal set 326 with one or more channelizing codes to produce decovered data sequence values that are accumulated from baseband traffic sequence set 332. This decoding process is known as decovering. Decovering a traffic signal involves the use of an orthogonal channelizing code, such as a Walsh code employed by base station 102 to encode the traffic signal. Decoder 306 determines an appropriate channelizing code through an accumulation process. Accumulation involves correlating despread signal set 326 with one or more channelizing codes. Decoder 306 produces a baseband traffic sequence set 332. Traffic sequence set 332 includes an in-phase traffic sequence 334 and a quadrature traffic sequence 336.

Decoder 308 decodes a pilot signal contained in despread signal set 326 through the decovering and accumulation techniques described above with reference to decoder 306. This decoding produces a baseband pilot sequence set 338. Pilot sequence set 338 includes an in-phase pilot sequence 340 and a quadrature pilot sequence 342.

Decoders 306 and 308 perform decoding operations that involve the use of orthogonal channelizing codes, such as Walsh codes. The channelizing codes employed by decoders 306 and 308 correspond to channelizing codes employed by encoding functionality within base station 102.

Pilot signals are used as a phase reference for the demodulation of traffic signals. The ability of WCD 106 to demodulate traffic signals is directly affected by the SNR of received pilot signals. Pilot filter 310 filters baseband sequence set 338 to eliminate noise from pilot sequence set 338, thereby increasing its SNR.

This filtering process produces a filtered pilot sequence set 344, which is sent to data demodulator 312. Filtered pilot sequence set 344 includes an in-phase (I) filtered pilot sequence 346 and a quadrature (Q) filtered pilot sequence 348.

Data demodulator 312 receives sequence sets 332 and 344. Data demodulator 312 retrieves a phase reference from filtered pilot sequence set 344. This phase reference enables data demodulator 312 to coherently demodulate baseband traffic sequence set 332 into symbol sequence 230. Output signal 230 is sent to combiner 210.

III. Velocity Responsive Power Control

The power control algorithm of WCD 106 is dynamically adjusted as a function of the device's velocity. Through this dynamic adjustment feature, WCD 106 prevents base station 102 from using excessive power to transmit traffic signals across traffic channel 116. This feature facilitates an efficient use of available transmit power and maximizes the number of communications devices that base station 102 can support.

The power control algorithm of WCD 106 is dynamically adjusted in response to velocity estimates provided by velocity estimator 212. These adjustments involve changing the rate at which power control commands are transmitted to base station 102.

When WCD 106 is moving, traffic channel 116 is characterized as a fading channel. Signals received across a fading channel exhibit fluctuations in amplitude and phase. Such fluctuations have a rate that is proportional to the velocity of WCD 106.

For conventional systems that employ fixed-rate power control commands, as the rate of amplitude and phase fluctuations varies, the effectiveness of these commands also varies. For instance, in wireless communications devices that employ a fixed command rate, there exists a velocity threshold $V_U$. When the velocity of WCD 106 exceeds $V_U$, the fixed command rate causes base station 102 to transmit excessive power. Thus, base station 102 uses a higher level of average power than is necessary to maintain its desired quality of service (e.g., a 1 percent FER). As described above, the transmission of signals having excessive power wastes overall system capacity.

Figure 4:
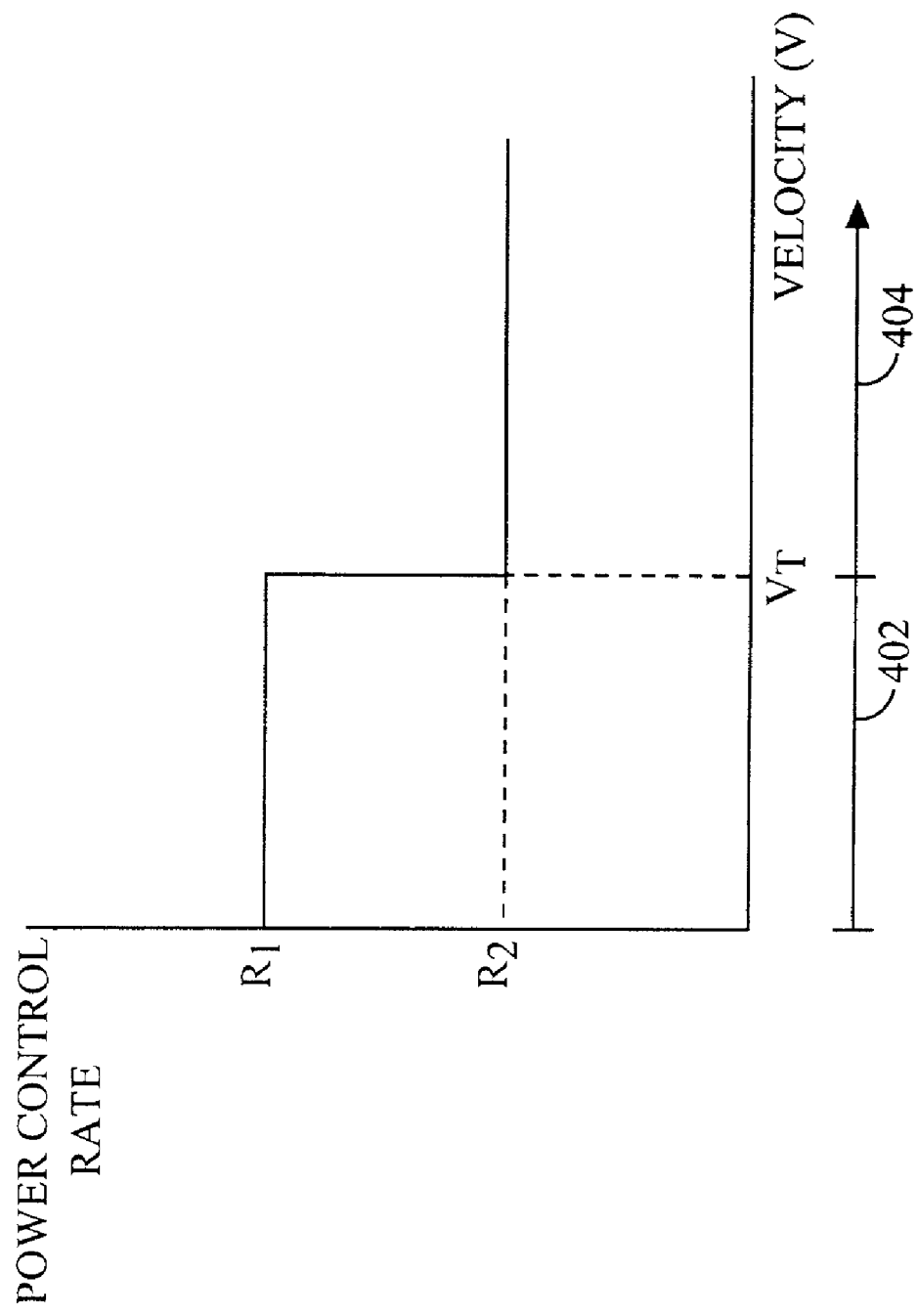
FIGS. 4 and 5 are diagrams illustrating operational parameters for two velocity responsive power control implementations.
Figure 5:
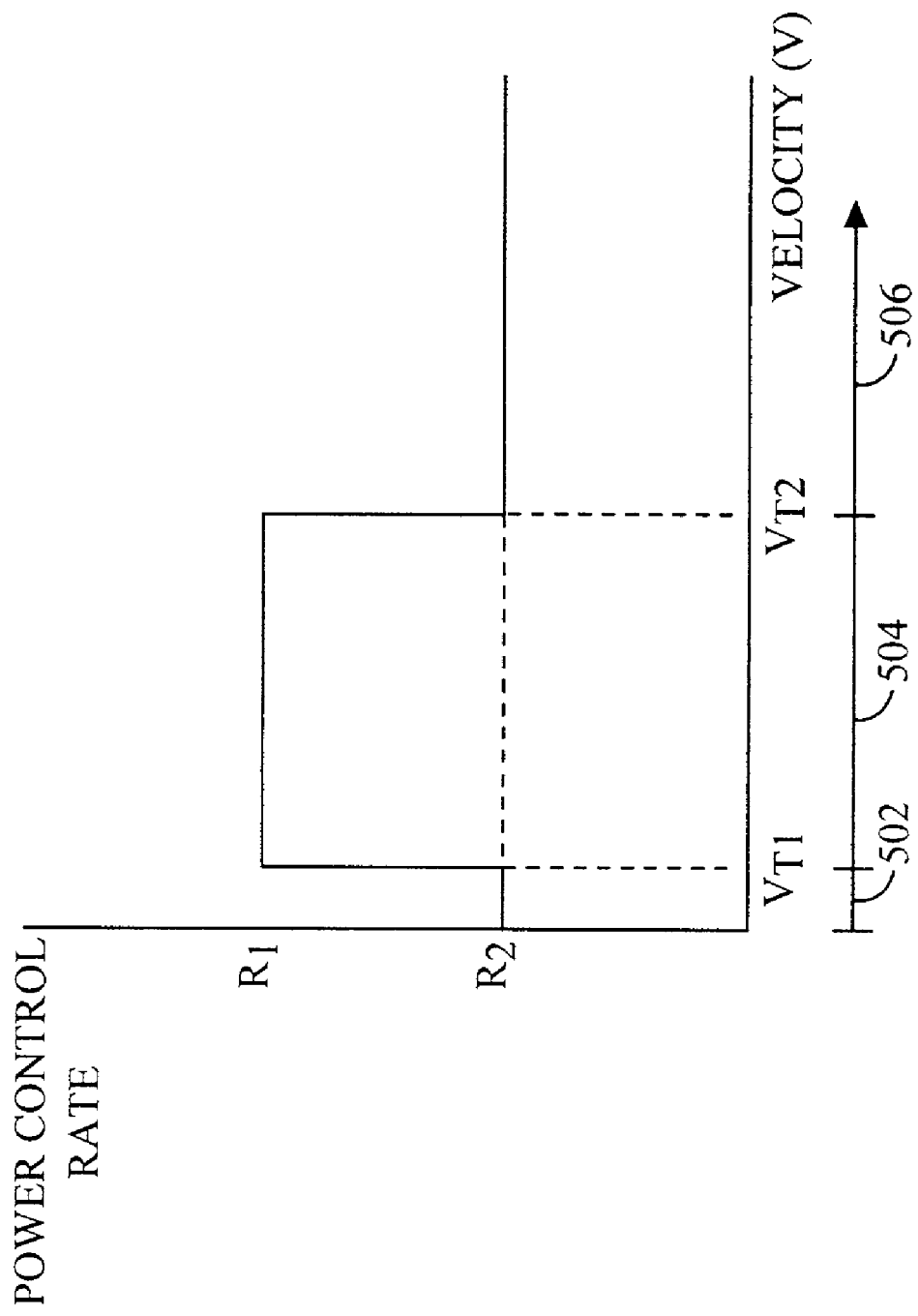

FIGS. 4 and 5 are diagrams illustrating operational parameters for two velocity responsive power control implementations of the present invention. These operational parameters are velocity ranges and corresponding power control rates. WCD 106 may operate according to these parameters to ensure efficient power utilization across traffic channel 116.

FIG. 4 illustrates two velocity ranges 402 and 404 that are separated by a threshold velocity, $V_T$. Velocity range 404 includes velocities that are greater than those included in range 402. When WCD 106 has a velocity that is within velocity range 402, it transmits power control commands to base station 102 at a rate, $R_1$. However, when WCD 106 has a velocity that is within velocity range 404, it transmits power control commands to base station 102 at a rate, $R_2$. As shown in FIG. 4, $R_1$ is greater than $R_2$.

Like the implementation shown in FIG. 4, the implementation of FIG. 5 illustrates two power control rates, $R_1$ and $R_2$. However, unlike the implementation of FIG. 4, this implementation employs three velocity ranges, 502, 504, and 506. A velocity threshold $V_{T2}$ separates velocity ranges 504 and 506. Velocity range 506 includes velocities that are greater than those included in range 504. A velocity threshold $V_{T1}$ separates velocity ranges 502 and 504. Velocity range 504 includes velocities that are greater than those included in range 502.

According to the implementation of FIG. 5, when WCD 106 has a velocity that is within velocity range 502, it transmits power control commands to base station 102 at a rate, $R_2$. However, when WCD 106 has a velocity that is within range 504, it transmits power control commands to base station 102 at a rate, $R_1$. When the velocity of WCD 106 is within range 506, WCD 106 employs command rate $R_2$.

In the implementation of FIGS. 4 and 5, $R_1$ is greater than $R_2$. However, other quantitative relationships may be employed. Also, since the implementation of FIG. 5 has three velocity ranges, WCD 106 may use three distinct power control rates, instead of two.

Many communications systems are constrained to using fixed power control command rates. Devices that operate in these fixed-rate systems transmit commands across reverse power control channel 118 at periodically occurring time slots. Unfortunately, these fixed-rate systems do not utilize power efficiently.

The present invention provides techniques that enable a plurality of power control rates to be generated in an otherwise fixed-rate system. These techniques involve generating one or more effective command rates that are less than the fixed command rate. In this manner, power can be utilized more efficiently than in fixed rate systems.

These effective command rates are achieved by issuing commands that cancel out each other's effects. These commands (referred to herein as dummy commands) are interleaved with actual power control commands (referred to herein as active commands) to provide an effective power control command rate that is less than the fixed command rate.

FIG. 6 is a chart illustrating a set of exemplary command patterns. Each of these patterns creates an effective power control rate that is less than the fixed command rate. In FIG. 6, a row 601 lists a series of time slots in a transmission stream across reverse power control channel 118. These time slots transmit commands in a sequential manner illustrated from left to right.

In a row 602, a fixed rate command stream 270 having a rate $R_{max}$ is shown. This command stream includes a plurality of active power control commands, denoted as $C_1, C_2, C_3$, etc. These active commands are either a power increase command or a power decrease command. As described above, active commands are generated by power control decision module 218 through the comparison of traffic SNR signal 260 with target SNR signal 254.

Rows 603, 604, and 605 provide examples of command streams 270 having effective rates that are less than $R_{max}$. Each of these command streams include a plurality of periodically occurring dummy command patterns having a plurality of dummy commands. These dummy commands are shown in FIG. 6 as either a U or a D. The symbol U designates a power increase command, while the symbol D designates a power decrease command. These dummy command patterns include alternating power increase and decrease commands that offset each other.

For each of the command streams of rows 603-605, a corresponding effective command rate is shown. These effective command rates are quantitatively defined in relation to $R_{max}$. For instance, the stream of row 603 has an effective power control rate that is 33% of $R_{max}$, the stream of row 604 has an effective power control rate that is 50% of $R_{max}$, and the stream of row 605 has an effective power control rate that is 60% of $R_{max}$. It is important to note that FIG. 6 shows a set of exemplary patterns that provide various effective command rates. Other command rates may be obtained through similar patterns.

Power control decision module 218 may associate each of a plurality of command stream patterns, such as the ones described above with reference to FIG. 6, with a particular velocity range. Thus, when WCD 106 has a velocity that is within a certain range, it employs the corresponding command stream pattern to achieve a desired command rate.

Figure 7:
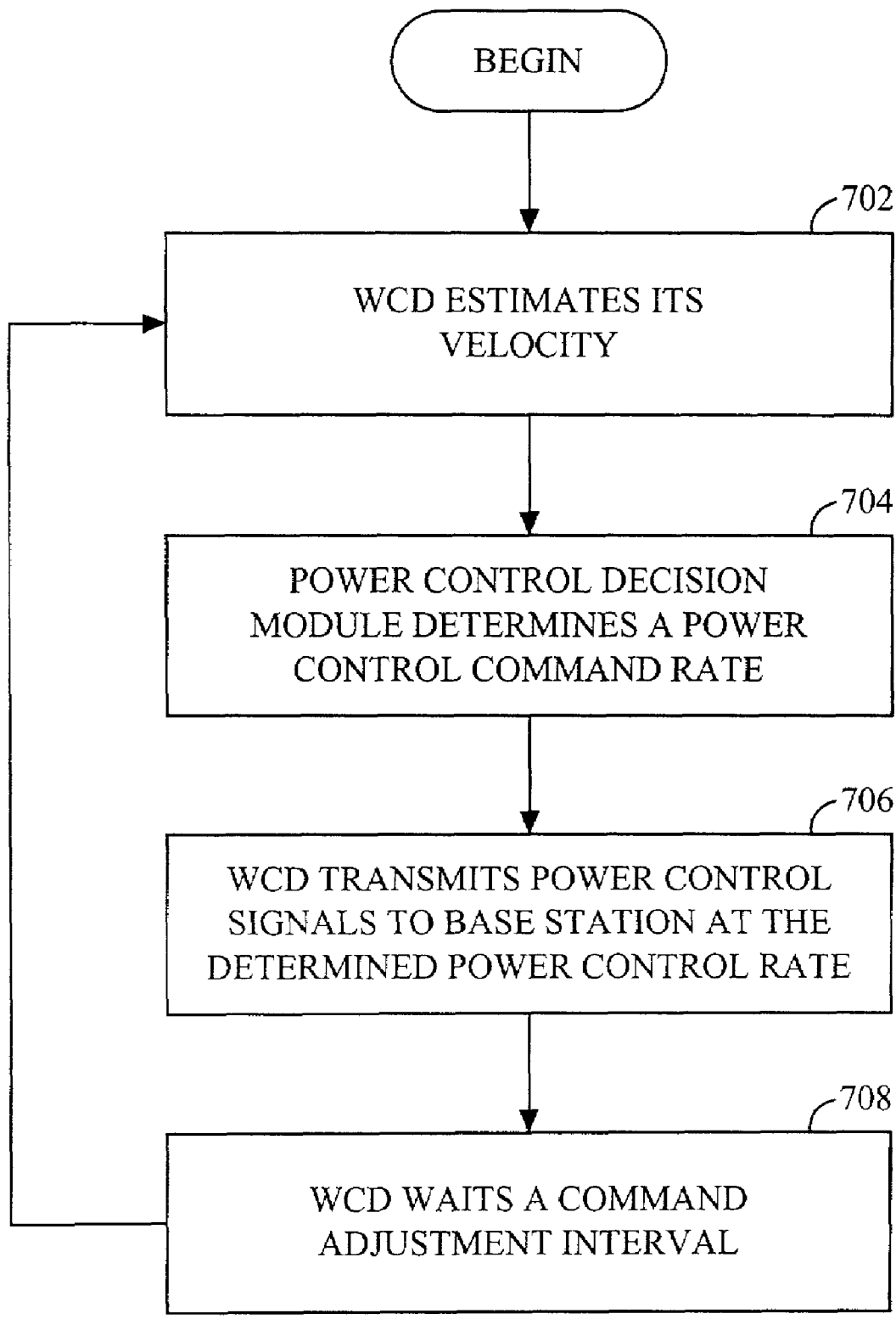
FIG. 7 is a flowchart illustrating an operational sequence involving velocity responsive power control.

FIG. 7 is a flowchart illustrating an operational sequence involving velocity responsive power control. This operational sequence begins with a step 702, where WCD 106 estimates its velocity. This step is performed by velocity estimator 212. Next, in a step 704, power control decision module 218 determines a power control command rate in response to the velocity estimated in step 702.

In step 704, power control decision module 218 may determine the power control command rate according to different strategies. For instance, step 704 may comprise decreasing the power control command rate from a first rate to a second rate when the estimated velocity surpasses a velocity threshold, $V_U$. With reference to the example of FIG. 4, such a decrease occurs when WCD 106 velocity exceeds the illustrated threshold velocity, $V_T$.

In addition, step 704 may comprise increasing the power control command rate from a first rate to a second rate when the estimated velocity surpasses a velocity threshold, $V_U$. With reference to the example of FIG. 5, such an increase occurs when WCD 106 velocity exceeds the illustrated threshold velocity, $V_{T1}$.

In a step 706, WCD 106 transmits power control signals to base station 102 according to the power control command rate determined in step 704. This step comprises the step of power control decision module 218 generating command stream 270 in accordance with the command rate determined in step 704.

When WCD 106 operates in a fixed command rate environment, step 706 comprises generating a command stream having one or more dummy patterns and one or more command patterns. This step yields an effective command rate that is less than the fixed command rate. As described above with reference to FIG. 6, the dummy patterns comprise alternating power increase and power decrease commands that offset each other.

The step of generating a command stream having one or more dummy patterns and one or more command patterns may include the steps of accessing a lookup table (such as the table shown in FIG. 6) according to the power control command rate determined in step 704, and selecting a corresponding command stream that is stored in the lookup table.

Steps 702 through 706 may be performed at periodically occurring time increments. Thus, in a step 708, WCD 106 waits a command rate adjustment interval before returning operation to step 702.

Figure 8:
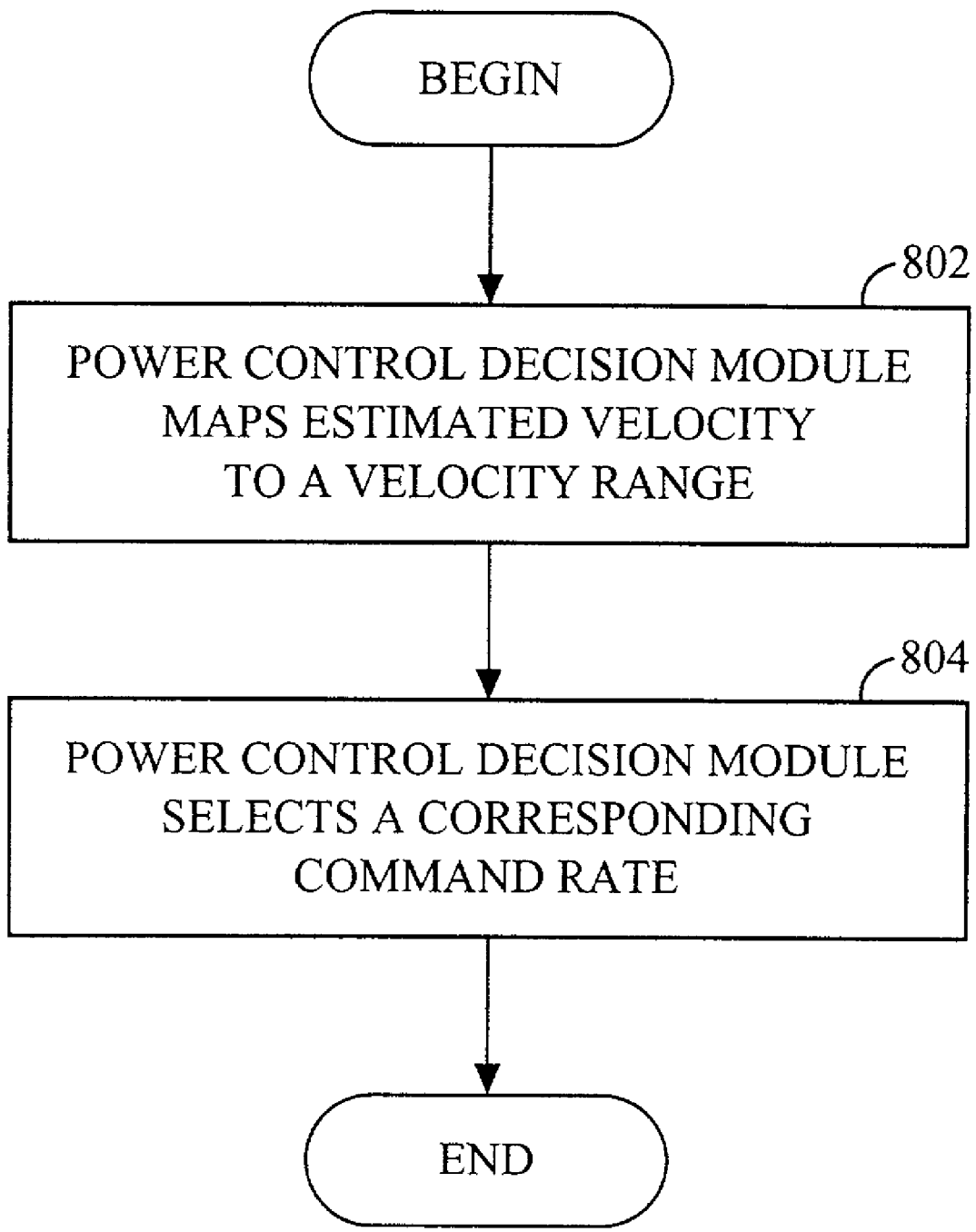
FIG. 8 is a flowchart illustrating.

FIG. 8 is a flowchart illustrating step 704 in greater detail. This performance begins with a step 802, where power control decision module 218 maps the velocity estimated in step 702 to a velocity range. FIGS. 4 and 5 provide examples of such velocity ranges.

Next, in a step 804, power control decision module 218 selects a rate that correlates the velocity range to the power control command rate.

Power control decision module 218 may store these velocity ranges and corresponding command rates in a lookup table (not shown).

IV. SNR Estimation

As described above, SNR estimator 219 estimates the SNR of traffic signals received from traffic channel 116. This traffic signal SNR is also referred to herein as traffic $E_b$/Nt. SNR estimator 219 calculates traffic $E_b$/Nt according to Equation (1), below.

$$\text{Traffic } E_b/Nt = \frac{\left(\sum_{f=1}^{N} \omega_f \cdot \sqrt{E_b(f)}\right)^2}{\sum_{f=1}^{N} \omega_f^2 \cdot Nt(f)} \quad (1)$$

In Equation (1), f is an integer index used to designate a particular demodulation finger 208 (hereinafter referred to as finger f), $T_f$ is a weighting factor used by combiner 250 in combining a symbol sequence 230 received from finger f, $E_b(f)$ is the bit energy of a traffic signal component processed by finger f, Nt(f) is the interference experienced by the traffic signal component processed by finger f, and N is the number of demodulation fingers 208 employed by WCD 106.

When combiner 210 combines each of symbol sequences 230 in an optimal manner, SNR estimator 219 may simplify the calculation of traffic $E_b$/Nt. Calculation of traffic $E_b$/Nt according to this simplified approach involves summing $E_b(f)/Nt(f)$ for each of demodulation fingers 208.

Calculation of traffic $E_b$/Nt through either the approach of Equation (1), or through the simplified summation approach requires the determination of $E_b(f)$ and Nt(f) for each of demodulation fingers 208. Techniques for determining these values are described below.

Nt(f) (i.e., the interference to the traffic signal component on finger f) includes thermal noise, interference from base stations other than base station 102, and interference from other multipath signal components received from base station 102. Nt(f) is calculated by measuring the total in band energy and subtracting out the non-interfering energy provided on the same path. This calculation is expressed below in Equation (2).

$$Nt(f) = Io - \hat{I}or(f) \quad (2)$$

In Equation (2), Io is an inband energy value, which represents the total energy received within a frequency band. $\hat{I}or(f)$ is a non-interfering energy value.

Îor(f) represents the total energy of signals (including transmissions to other WCDs 106) that originate from base station 102, but arrive on a path in which finger f is locked. In CDMA communications systems, signals transmitted on a single path are orthogonal to one another. Thus, Îor(f) is a measure of non-interfering energy that does not contribute to the degradation of a received signal.

Two techniques of calculating Nt(f) are provided herein. The first of these techniques utilizes a special message sent between base station 102 and WCD 106. The second of these techniques does not require base station 102 to transmit any special messages.

A first technique of calculating Nt(f) is referred to herein as the pilot fraction method. According to this method, base station 102 transmits signaling data referred to herein as a pilot fraction. For a particular pilot signal, the pilot fraction indicates the ratio of pilot signal energy to total energy transmitted by base station 102. Equation (3), below, provides an expression of the pilot fraction.

$$\text{Pilot Fraction} = \frac{\text{Pilot } Ec}{Ior} \quad (3)$$

In Equation (3), Pilot Ec represents the energy in a pilot signal "chip" transmitted by base station 102, and Ior is the total energy of the signal transmitted by base station 102. Ior is normalized by the receive bandwidth of WCD 106. Thus, the pilot fraction, as expressed in Equation (3), is unitless.

Base station 102 generates a message containing the pilot fraction and transmits this message to WCD 106 across a channel, such as traffic channel 116 or a sync channel (not shown). When the pilot fraction is transmitted across traffic channel 116, each demodulation finger 208 passes a pilot fraction to combiner 210 as information contained in its respective symbol sequence 230. Combiner 210 separates pilot fraction messages from each symbol sequence 230.

In conjunction with receiving the pilot fraction, WCD 106 measures the energy of a received pilot chip. This measured energy is passed to SNR estmator 219 of combiner 210.

As described above, base station 102 transmits a pilot signal across pilot channel 114. Each demodulation finger 208 receives and processes a pilot signal component into a corresponding filtered pilot sequence set 344. To measure the energy of a received pilot chip, data demodulator 312 calculates a "sum of squares" for the individual sequences within sequence set 344. For example, in QPSK implementations, where sequence set 344 includes an in-phase (I) filtered pilot sequence 346 and a quadrature (Q) filtered pilot sequence 348, data demodulator 312 performs the calculation expressed below in Equation (4).

$$\text{Pilot } E_c = I^2 + Q^2 \quad (4)$$

In Equation (4), Pilot $E_c$ represents an energy estimate of a chip of filtered pilot sequence set 344, I represents a value of in-phase filtered pilot sequence 346, and Q represents a value of quadrature filtered pilot sequence 348. Data demodulator 312 sends Pilot $E_c$ to SNR estimator 219 within combiner 210.

As shown above in Equation (2), Îor(f) is needed to calculate Nt(f), where f designates a particular demodulation finger 208. Accordingly, upon receipt of Pilot $E_c$, SNR estimator 219 computes an estimate of Îor(f) that is received by finger f. This computation is expressed below in Equation (5).

$$\text{Îor}(f) = \text{Pilot Fraction}^{-1} \times \text{Pilot } E_c \quad (5)$$

To complete the calculation of Equation (2), automatic gain control (AGC) module 206 determines an Io value (i.e., in band energy) and sends this determined value to SNR estimator 219 as an Io signal 248. After Io and Îor(f) are determined for finger f, combiner 210 calculates Nt(f) by performing Equation (2).

An alternative to the pilot fraction method of computing Nt(f) is referred to herein as the pilot scatter method. With this method, WCD 106 is not provided with a pilot fraction. Instead, WCD 106 estimates noise Nt(f) by compiling information based on the variations in the energy of the received pilot signal. Namely, WCD 106 computes an estimate of Nt(f) according to Equation (6).

$$Nt(f) = \frac{\sum_{i=1}^{N} [X_I^2(i) + X_Q^2(i)] - \frac{1}{N}\left(\sum_{i=1}^{N} X_I(i)\right)^2 - \frac{1}{N}\left(\sum_{i=1}^{N} X_Q(i)\right)^2}{N-1} \quad (6)$$

In Equation (6), $X_I(i)$ is in-phase filtered pilot sequence 346, $X_Q(i)$ is quadrature filtered pilot sequence 348, and N is a predetermined number of samples that is chosen to calculate Nt(f). An exemplary value of N is 24.

In addition to calculating Nt(f), the determination of $E_b$/Nt according to Equation (1) requires the calculation of a traffic data bit energy (i.e., $E_b(f)$) for each demodulation finger 208. For each demodulation finger 208, the corresponding data demodulator 312 performs this calculation.

Traffic data bit energy, $E_b(f)$ is derived from a traffic data symbol energy, $E_s(f)$. Data demodulator 312 calculates $E_s(f)$ by processing baseband traffic sequence set 332.

To measure the energy of a received traffic signal, data demodulator 312 calculates a "sum of squares" for the individual sequences within sequence set 332. For instance, in QPSK implementations, where sequence set 332 includes in-phase traffic sequence 334 and quadrature traffic sequence 336, data demodulator 312 performs the calculation expressed below in Equation (8).

$$E_s(f) = I^2 + Q^2 \quad (8)$$

In Equation (8), I represents a value of in-phase traffic sequence 334, and Q represents a value of quadrature traffic sequence 336. In addition to calculating $E_s(f)$ according to Equation (8), demodulator 312 may filter the result of Equation (8), thereby producing a smoothed $E_s(f)$.

After calculation of $E_s(f)$, data demodulator 312 derives $E_b$ according to the relationship expressed below in Equation (9).

$$E_b(f) = E_s(f) \cdot \frac{R_s}{R_b} \quad (9)$$

In Equation (9), $R_s$ represents the symbol rate of baseband traffic sequence set 332, and $R_b$ represents the effective bit rate of baseband traffic sequence set 332.

Upon performance of Equation (9), each data demodulator 312 passes a corresponding $E_b(f)$ to SNR estimator 219. Thus, with the determination of $N_t(f)$ and $E_b(f)$ for each demodulation finger 208, SNR estimator 219 may calculate $E_b$/Nt according to Equation (1) or according to the simplified $E_b$/Nt computation technique that involves summing each value of $E_b(f)/Nt(f)$.

V. Velocity Estimator

As described above with reference to FIG. 2, velocity estimator 212 receives control signal 244 from AGC module 206 and baseband pilot sequence set 246 from one of demodulation fingers 2108. From these inputs, velocity estimator 212 generates velocity estimate signal 242, which is sent to power control decision module 218 to provide velocity-responsive power control.

Velocity estimator 212 utilizes fading characteristics of multipath transmissions to estimate the velocity of WCD 106. As described above, the physical terrain and structure surrounding WCD 106 create multiple signal paths from the base station 102 to WCD 106. Each multipath component can be modeled as a composite signal having a slow fade component and a fast fade component.

Figure 9:
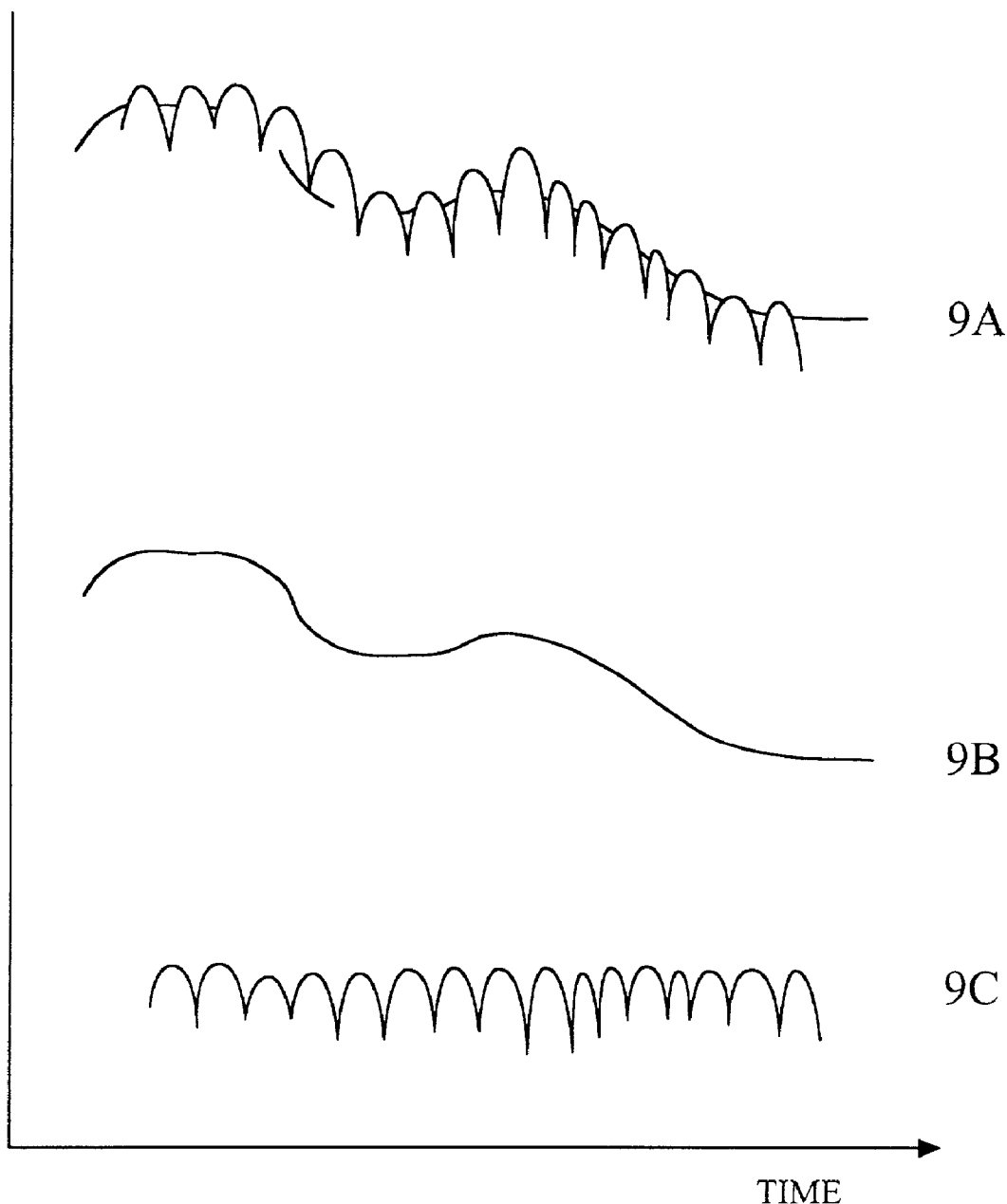
FIGS. 9A-9C are graphs illustrating multipath fading characteristics.

FIG. 9A provides an example of such a composite signal received by WCD 106. This signal exhibits a variation in time of the received signal power due to slow fade and fast fade components, is shown in FIG. 9A. The corresponding slow fade component of the composite received signal is shown in FIG. 9B. The corresponding fast fade, or Rayleigh fade, component of the composite received signal is shown in FIG. 9C. AGC module 206 is able to compensate for nearly all of the effects of such slow fading. Additionally, AGC module 206 is able to compensate for a portion of the effects of such Rayleigh fading.

Velocity estimator 212 performs measurements of the power in a single multipath component over time to estimate the velocity of WCD 106. These estimates are based on the number of times the power of this multipath component crosses one half of its RMS power level in a given period of time. This quantity is referred to herein as the level crossing rate.

More particularly, velocity estimator 212 bases the value of velocity estimate signal 242 upon the number of times the fast fade portion of a multipath signal component crosses the one half RMS power level threshold over a given period of time. This threshold is not the only threshold that can be used for velocity estimation. Any other fraction or multiple of the RMS power level may be chosen as the threshold level. However, using one half of the RMS power level as a threshold results in a maximum level crossing rate for a given velocity.

Since velocity estimator 212 estimates the power of a single multipath component, it processes a baseband pilot sequence set 246 from one of demodulation fingers 208, which represents an isolated multipath pilot signal.

Since AGC module 206 maintains signal set 220 at a substantially constant power level, it essentially eliminates information that is needed for velocity estimator 212 to estimate the power of a multipath component, as received through antenna segment 202. Therefore, to measure the power of an isolated multipath component, the gain adjustments performed by AGC module 206 must be removed.

Figure 10:
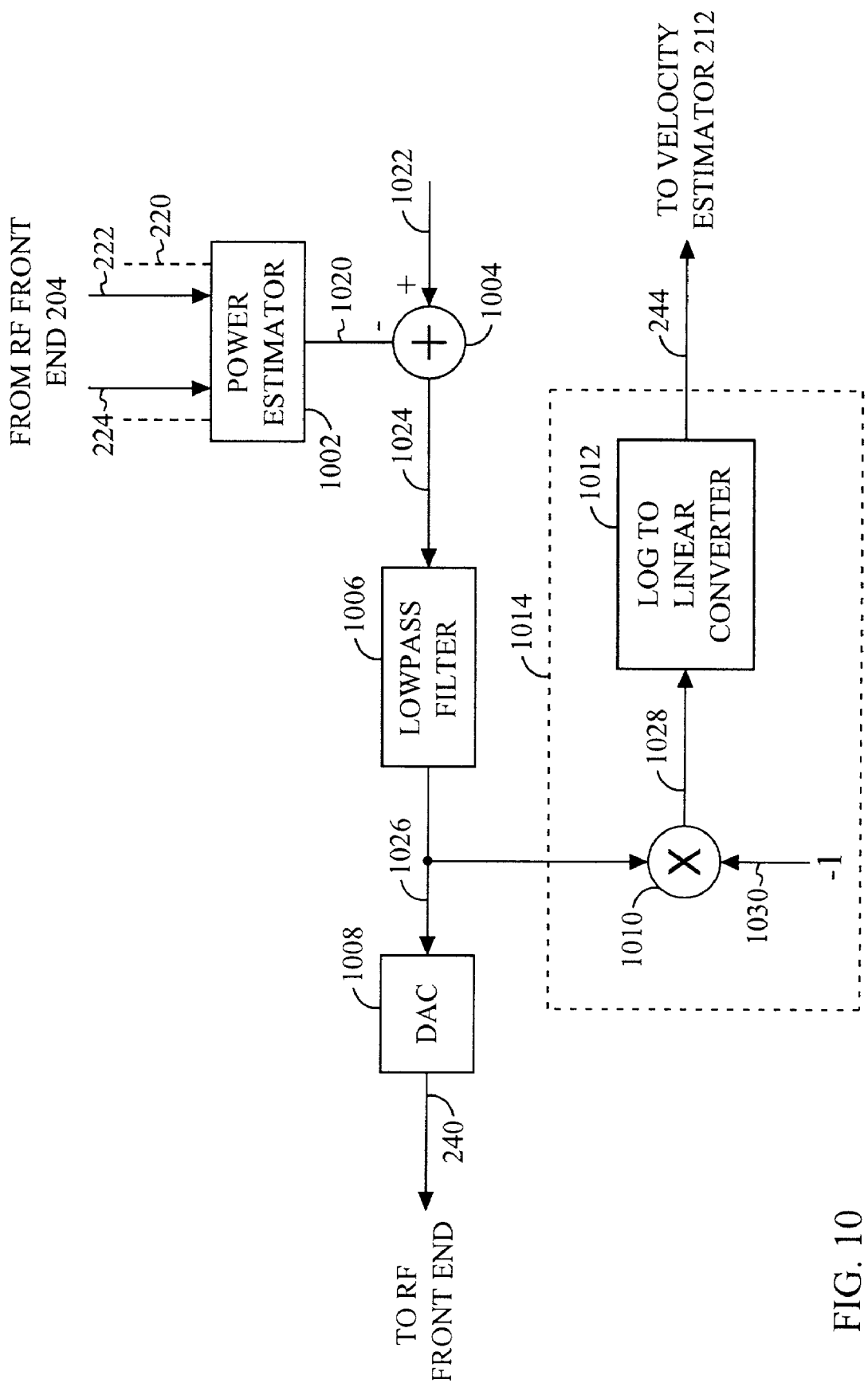
FIG. 10 is a block diagram illustrating an implementation of an automatic gain control module.

The gain adjustment effects of AGC module 206 are removed by a scaling feature that adjusts amplified signals by the inverse of the gain controlled by AGC module 206. FIG. 10 is a block diagram illustrating an implementation of AGC module 206 that provides such a scaling feature.

FIG. 10 shows a power estimator 1002, a summation node 1004, a lowpass filter 1006, a digital to analog converter (DAC) 1008, an inverting node 1010, and a log to linear converter 1012. Together, inverting node 1010, and log to linear converter 1012 are included in a scaling module 1014.

Power estimator 1002 receives baseband signal set 220 (i.e., signal components 222 and 224) and estimates its instantaneous power. Power estimator 1002 outputs a power estimate signal 1020 that is sent to summation node 1004. At summation node 1004, power estimate signal 1020 is subtracted from a predetermined set point 1022. Predetermined set point 1022 is chosen to represent a power value near the upper bound of analog to digital converter(s) (ADCs) within RF front end 204 that are employed to produce baseband signal set 220. When power estimate signal 1020 exceeds set point 1022, summation node 1004 produces an adjustment signal 1024 that reduces the gain of amplification component(s) within RF front end 204. However, when power estimate signal 1020 is less than set point 1022, adjustment signal 1024 increases the gain of such amplification component(s).

Adjustment signal 1024 is sent to low pass filter 1006, which produces a digital control signal 1026. Digital control signal 1026 is sent to (DAC) 1008 to generate gain control signal 240, which is sent to RF front end 204. DAC 1008 may be removed for implementations of RF front end 204 that receive digital gain control signals 240. As described above, amplification component(s) within RF front end 204 vary their gain according to the value of gain control signal 240.

Digital control signal 1026 is also sent to scaling component 1014, where it is input to inverting node 1010. Inverting node 1010 is shown as a multiplier having a multiplication factor of −1. However, other suitable implementations may be employed. Inverting node 1010 generates an inverted control signal 1028, which is sent to log to linear converter 1012. Log to linear converter 1012 operates according to a transfer function. This transfer function is the inverse of the function that defines the relationship between gain control signal 240 values and amplification gain of RF front end 204. As a result of this transfer function, log to linear converter 1012 produces voltage estimate 244, which is an estimate of the component signal's voltage, as received through antenna segment 202.

Scaling module 1014 provides sufficient signal processing to allow an accurate determination of the level crossing rate when the SNR of a received signal is high. This is because noise components in the received signal are insignificant in relation to the received signal power and thus do not adversely contribute to the determination of the level crossing rate. However, when noise components represent a significant contribution to the total power of a received signal, the noise components adversely contribute to the determination of the level crossing rate when a single threshold is used.

The frequency of a composite signal's fast fading component can be estimated using the expected velocity range that the receiver will experience. The pilot integration time must be sufficiently less than the period of the fast fade in order to reliably detect level crossings. Because this amount of time is finite when the channel exhibits fading, measured pilot power has a certain amount of noise associated with it. This amount of noise may be represented as an SNR measurement.

The SNR of an integrated pilot signal's power is directly proportional to a quantity expressed below in Equation (10).

$$\text{Iorhat}_0 * (\text{Ecp/Ior})/(\text{Ioc}+\text{Nt}) \qquad (10)$$

In Equation (10), $\text{Iorhat}_0$ represents the amount of signal power received at WCD 106 in a path 0, (Ecp/Ior) represents the ratio of pilot signal energy to the total energy transmitted at base station 102, and (Ioc+Nt) represents the total interference due to adjacent base stations and thermal noise.

Therefore, as indicated by Equation (10), when the total receive power of a pilot signal is low or when its associated levels of interference and noise are high, the measurement of a pilot signal's power is noisy. This noise causes the estimate of the pilot signal's power to traverse a level crossing threshold value many times. In contrast, when a pilot signal is received in a noise free system, its power traverses a level crossing threshold value only once.

In order to decrease the effect of a pilot signal's SNR on its level crossing rate, velocity estimator 212 employs level crossing hysteresis. This hysteresis feature employs a high threshold and a low threshold. According to this feature, a signal's amplitude is not considered to cross the employed threshold level unless it starts below the lower hysteresis threshold (set N dB lower than the employed threshold level) and then crosses the upper hysteresis threshold (set M dB higher than the employed threshold level), or vice versa.

For a particular signal, the threshold level that results in a maximum number of level crossings is one half of the signal's RMS signal power. However, any level relative to the RMS power level may be used. In an exemplary implementation, M and N are each set to 3 dB. However, these values may differ.

Therefore, the hysteresis feature employed by velocity estimator 212 prevents small changes in the measurement of a signal's amplitude that are less than (N+M) dB from getting considered in level crossing rate computations. The level hysteresis algorithm employed by velocity estimator 212 can be expressed by the following pseudocode. In this pseudocode, s(n) represents the symbol amplitude at a time n, $T_H$ represents a high hysteresis threshold level, and $T_L$ represents a low hysteresis threshold level.

```
if (s(n) < T_L ) {
  if (thresholdFlag == 0) {
    levelCrossingCounter++;
  }
  thresholdFlag = 1;
}
else if (s(n) > T_H) {
  if (thresholdFlag = = 1)
    levelCrossingCounter++;
  }
  thresholdFlag = 0;
}
```

Figure 11:
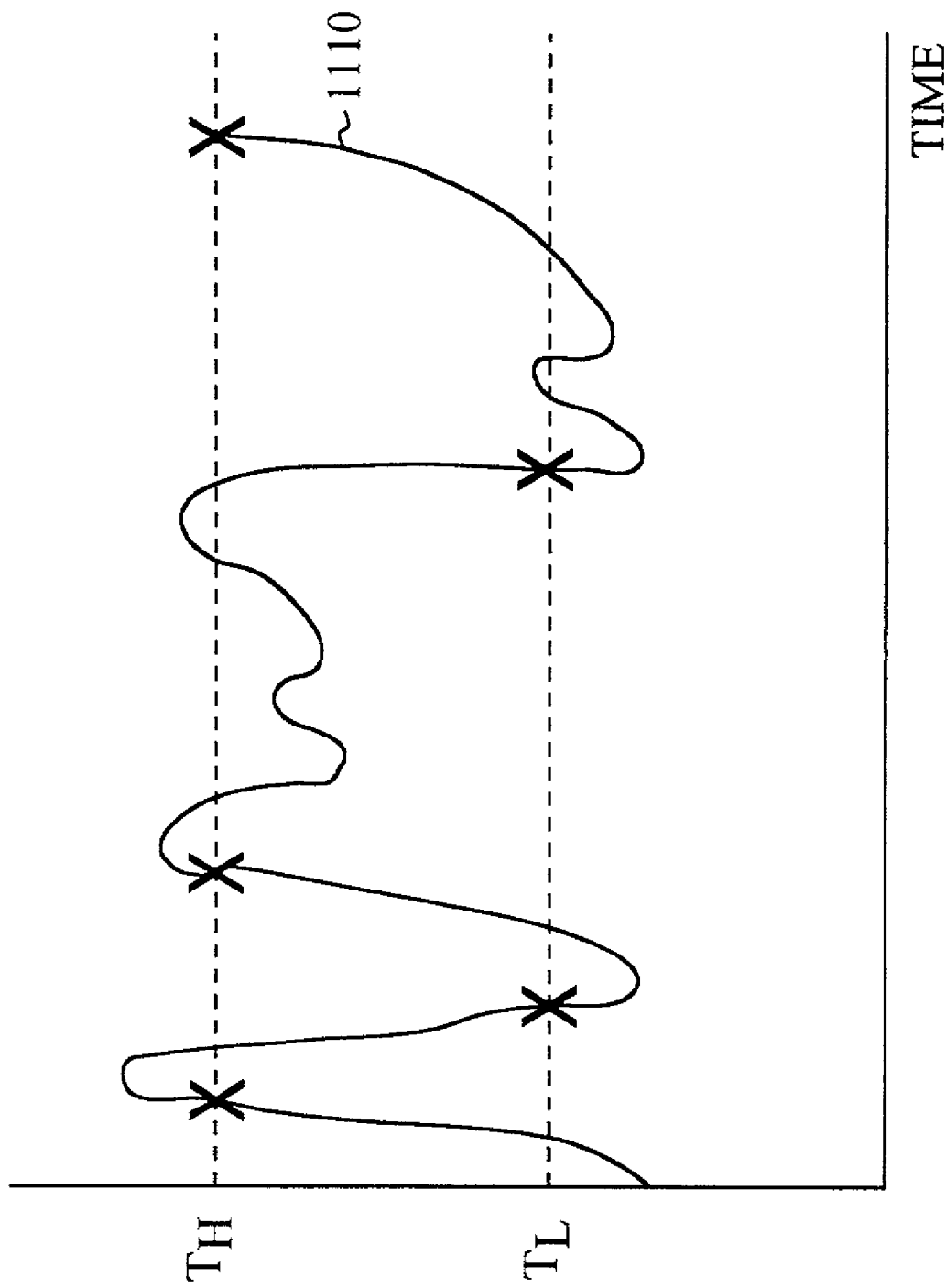
FIG. 11 is a graph showing an estimate of a signal in a noisy environment.

FIG. 11 is a graph showing an application of the level hysteresis algorithm to a multipath 1110 over time in a noisy environment. Ordinarily, fast fading produces signals, such as the one shown in FIG. 9C. However, contributions from noise component result in a noisy estimate of the multipath signal. This high hysteresis threshold is denoted as $T_H$ and the lower hysteresis threshold is denoted as $T_L$. The predetermined threshold level to determine level crossings (not shown) is at a power level that is between hysteresis thresholds $T_H$ and $T_L$. When the hysteresis algorithm is applied to this noisy signal estimate, level crossings are considered to occur only at points denoted in FIG. 11 by "X".

Figure 12:
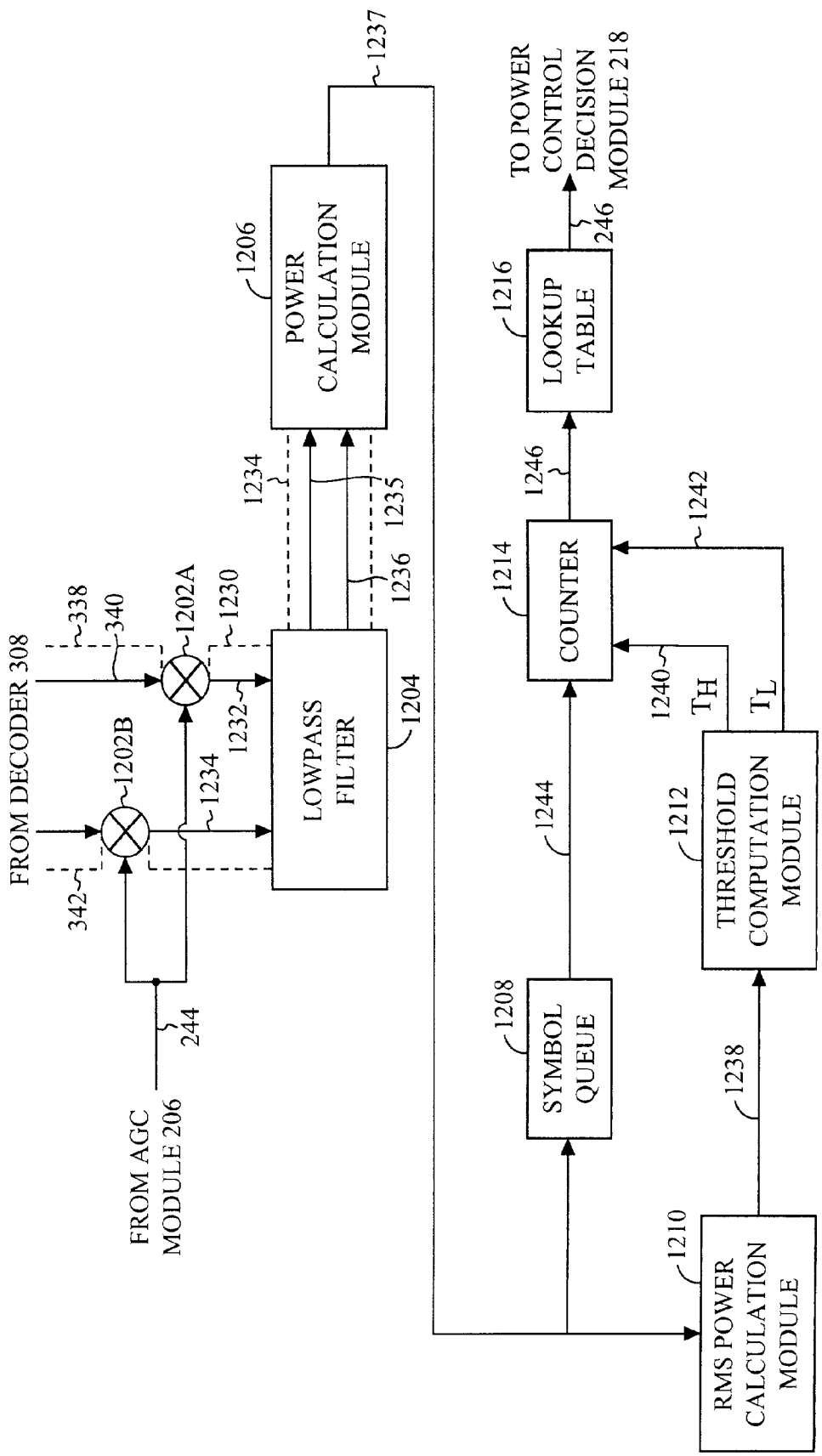
FIGS. 12 and 13 are block diagrams showing velocity estimator implementations.

FIG. 12 is a block diagram illustrating a first implementation of velocity estimator 212, which employs the hysteresis algorithm described above. This implementation includes multiplication nodes 1202a and 1202b, a lowpass filter 1204, a power calculation module 1206, a symbol queue 1208, an RMS power calculation module 1210, a threshold computation module 1212, a counter 1214, and a lookup table 1216.

A voltage estimate 244 is received from AGC module 206 at multiplication nodes 1202a and 1202b. At these nodes, voltage estimate 244 is multiplied with a corresponding sequence within baseband pilot sequence set 338.

Multiplication nodes 1202a and 1202b produce a sequence set 1230 that represents baseband sequence set 338 with the power stabilization effects of AGC module 206 removed. Sequence set 1230 includes an in-phase sequence 1232 and a quatrature sequence 1234.

Sequence set 1230 is sent to low pass filter 1204, which produces a filtered sequence set 1234 including in-phase sequence 1235 and quadrature sequence 1236. Power calculation module 1206 receives filtered sequence set 1234 and calculates its instantaneous power.

To calculate instantaneous power, power calculation module 1206 computes the sum of the squares of each sequence within filtered sequence set 1234 and calculates the square root of this sum. Power calculation module 1206 outputs this instantaneous power as energy sequence 1237. Power signal 1237 is sent to queue 1208 and RMS power calculation module 1210.

RMS power calculation module 1210 calculates a RMS power sequence 1238 using a predetermined number of consecutive values of energy sequence 1237. RMS power sequence value is sent to threshold computation module 1212. Threshold computation module 1212 uses the predetermined hysteresis values (M and N) as described above to calculate upper and lower level crossing thresholds 1240 and 1242. These thresholds are coupled to a level crossing counter 1214.

Queue 1208 is a first in first out (FIFO) buffer. Queue 1208 has a depth that corresponds to the number of symbols used in the running calculations performed by RMS power calculation module 1210. Thus, symbol queue 1208 delays energy sequence 1237 and sends a delayed energy sequence 1244 to counter 1214.

Counter 1214 counts the number of level crossings of energy sequence 1244 using thresholds 1240 and 1242 to provide hysteresis in the counting. In performing such counting, counter 1214 outputs a count 1246, which is sent to lookup table 1216.

Lookup table 1216 maps the number of level crossings (as indicated by count 1246) that occur in a given period of time to an estimated velocity. The velocity estimate is output as velocity estimate 246. Alternatively, velocity estimator 212 may be implemented without lookup table 1216. In such implementations, count 1246 is used directly as a velocity estimate.

Figure 13:
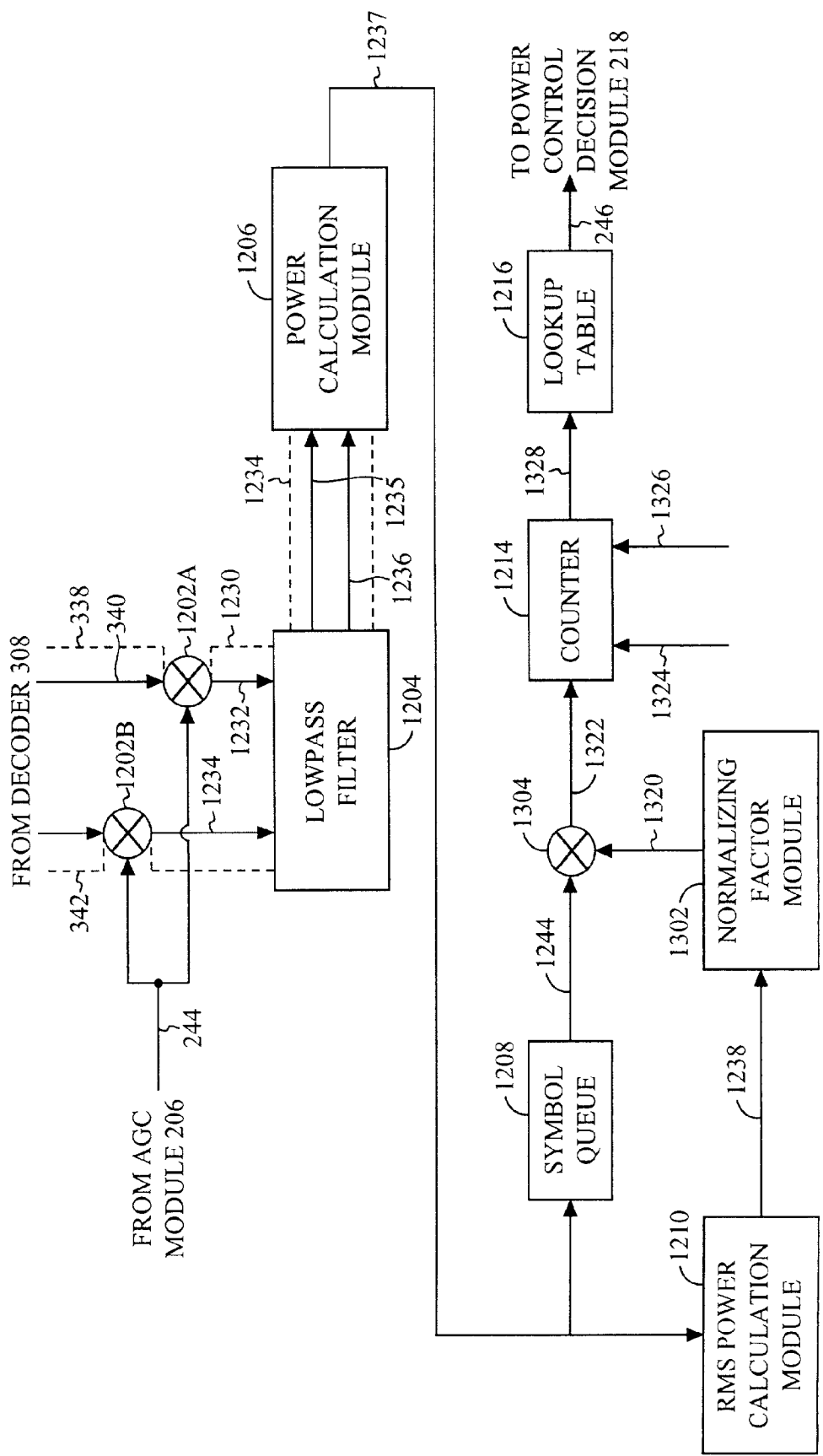

A second implementation of velocity estimator 212 is shown in FIG. 13. This implementation is similar to the implementation shown in FIG. 12. In fact, both implementations are the same from the reception of voltage estimate 244 to the generation of energy sequence 1237. However, the second implementation calculates level crossings in a different manner.

In the second implementation, energy sequence 1237 is sent to queue 1208 and RMS power calculation module 1210, as in the first implementation. However, in the second implementation, RMS power calculation module 1210 sends RMS power sequence 1238 to a normalizing factor module 1302. Normalizing factor module 1302 calculates and outputs 2/x, where x represents RMS power sequence 1238 and 2/x is a normalizing factor 1320.

Normalizing factor 1320 is sent a multiplication node 1304, which also receives delayed energy sequence 1244 from queue 1208. Multiplication node 1304 multiplies these inputs and generates a normalized sequence 1322. Normalized sequence 1322 represents delayed energy sequence 1244 normalized by one-half of RMS power sequence 1238.

Normalized sequence 1322 is sent to counter 1214, which counts the number of level crossings of sequence 1322. However, unlike the implementation of FIG. 12, where counter 1214 receives varying hysteresis thresholds, in the implementation of FIG. 13, counter 1214 receives hysteresis thresholds that remain constant. These constant thresholds are shown in FIG. 13 as high threshold 1324 and low threshold 1326. This implementation may employ constant hysteresis values because sequence 1322 is normalized by a value proportional to RMS power sequence 1238.

Counter 1214 outputs a count 1328, which is sent to lookup table 1216 to determine velocity estimate 246. In the second implementation, as in the first implementation, lookup table 1216 is optional. Thus, count 1328 may be used directly, or velocity estimate 246 may be calculated from it.

VI. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

For instance, the above description involves signal and symbol sets having in-phase and quadrature components. These sets are associated with QPSK modulation. However, the present invention may employ other types of signal sets that are associated with other modulation techniques. These sets may include any number of components. For example, such sets may be associated with binary phase shift keying (BPSK) and include only a single component.

In addition, although the implementations of velocity estimator 212 described above perform velocity estimation using level crossing measurements, velocity estimator 212 may perform such estimation through the periodic monitoring of the device's location through services, such as the global positioning system (GPS).

Also, implementations of time tracking loop filter 318 may include a plurality of filter paths, where each filter path receives a gain signal having a value that depends on the velocity of WCD 106.

Furthermore, the techniques of the present invention may be employed in other communications environments that do not involve IS-95 or CDMA.

What is claimed is:

1. A method of providing velocity responsive power control in a wireless communications device (WCD) that receives signals from a base station, comprising the steps of:
   estimating a velocity of the WCD;
   determining a power control command rate in response to the estimated velocity of the WCD; and
   transmitting power control signals to the base station according to the power control command rate.

2. The method of claim 1, wherein said transmitting step comprises the step of generating a command stream having one or more dummy patterns and one or more command patterns.

3. The method of claim 1, wherein said determining step comprises the steps of:
   mapping the estimated velocity to-a velocity range; and
   selecting a rate that corresponds to the velocity range as the power control command rate.

4. The method of claim 1, wherein said determining step comprises the steps of:
   decreasing the power control command rate from a first rate to a second rate when the estimated velocity surpasses a velocity threshold ($V_U$).

5. The method of claim 1, wherein said determining step comprises the steps of:
   increasing the power control command rate from a first rate to a second rate when the estimated velocity surpasses a velocity threshold ($V_U$).

6. The method of claim 1, wherein said estimating step comprises the step of measuring a level crossing rate of a multipath signal.

7. The method of claim 1, wherein said estimating, determining, and transmitting steps are performed at periodically-occurring time increments.

8. A system for providing velocity responsive power control in a wireless communications device (WCD) that receives signals from a base station, comprising:
   a velocity estimator that estimates a velocity of the WCD; and
   a power control decision module that determines a power control command rate in response to the estimated velocity of the WCD and transmits power control signals to the base station according to the power control command rate.

9. The system of claim 8, wherein said power control decision module generates a command stream having one or more dummy patterns and one or more command patterns.

10. The system of claim 8, wherein said power control decision module
    maps the estimated velocity to a velocity range, and selects a rate that corresponds to the velocity range as the power control command rate.

11. The system of claim 8, wherein said power control decision module
    decreases the power control command rate from a first rate to a second rate when the estimated velocity surpasses a velocity threshold ($V_U$).

12. The system of claim 8, wherein said power control decision module increases the power control command rate from a first rate to a second rate when the estimated velocity surpasses a velocity threshold ($V_U$).

13. The system of claim 8, wherein said velocity estimator measures a level crossing rate of a multipath signal to generate the estimated velocity.

14. Apparatus for providing velocity responsive power control in a wireless communications device (WCD) that receives signals from a base station:
    means for estimating, a velocity of the WCD;
    means for determining a power control command rate in response to the estimated velocity of the WCD; and
    means for transmitting power control signals to the base station according to the power control command rate.

15. The apparatus of claim 14, wherein said transmitting means further comprises means for generating a command stream having one or more dummy patterns an done or more command patterns.

16. The apparatus of claim 14, wherein said determining means further comprises:
    means for mapping the estimated velocity to a velocity range; and
    means for selecting a rate that corresponds to the velocity range as the power control command rate.

17. The apparatus of claim 14, wherein said determining means further comprises:
    means for decreasing the power control command rate from a first rate to a second rate when the estimated velocity surpasses a velocity threshold($V_U$).

18. The apparatus of claim 14, wherein said determining means further comprises:
    means for increasing the power control command rate from a first rate to a second rate when the estimated velocity surpasses a velocity threshold($V_U$).

19. The apparatus of claim 14, wherein said estimating means further comprises means for measuring a level crossing rate of a multipath signal.

20. The apparatus of claim 14, wherein said estimating, determining, and transmitting means operate at periodically-occurring time increments.

21. A method of providing velocity responsive power control in a wireless-communications device (WCD) that receives signals from a base station, comprising the steps of:
   estimating a velocity of the WCD;
   determining a power control command rate in response to-the estimated velocity; and
   transmitting power control signals to the base station according to the power control command rate, wherein said transmitting step comprises the step of generating a command stream having-one or more dummy patterns and one or more command patterns and wherein each of the one or more dummy patterns includes alternating power increase and power decrease commands that offset each other.

22. A system for providing velocity responsive power control in a wireless communications device (WCD) that receives signals from a base station, comprising:
   a velocity estimator that estimates a velocity of the WCD; and
   a power control decision module that determines a power control command rate in response to the estimated velocity and transmits-power control signals to the base station according to the power control command rate, wherein said power control decision module generates a command stream having one or more dummy patterns and one or more command patterns and wherein each of the one or more dummy patterns includes alternating power increase and power decrease commands that offset each other.

23. An apparatus for providing velocity responsive power control in a wireless communications device (WCD) that receives signals from a base station:
   means for estimating a velocity of the WCD;
   means for determining a power control command rate in response to the estimated velocity; and
   means for transmitting power control signals to the base station according to the power control command rate, wherein said transmitting means further comprises means for generating a command stream having one or more dummy patterns and one or more command patterns and wherein each of the one or more dummy patterns includes alternating power increase and power decrease commands that offset each other.

* * * * *